United States Patent
Carapelli et al.

(10) Patent No.: US 10,155,652 B2
(45) Date of Patent: Dec. 18, 2018

(54) FUEL DISPENSING ENVIRONMENT UTILIZING FUELING POSITION AVAILABILITY INDICATOR SYSTEM

(71) Applicant: Gilbarco Inc., Greensboro, NC (US)

(72) Inventors: Giovanni Carapelli, High Point, NC (US); Michael Charles Liebal, Greensboro, NC (US); Andrew Pearce, Raleigh, NC (US); Wayne McNinch, Greensboro, NC (US)

(73) Assignee: Gilbarco Inc., Greensboro, NC (US)

( * ) Notice: Subject to any disclaimer, the term of this patent is extended or adjusted under 35 U.S.C. 154(b) by 0 days.

(21) Appl. No.: 15/660,370

(22) Filed: Jul. 26, 2017

(65) Prior Publication Data
US 2018/0029869 A1   Feb. 1, 2018

Related U.S. Application Data

(60) Provisional application No. 62/368,063, filed on Jul. 28, 2016, provisional application No. 62/481,639, filed on Apr. 4, 2017.

(51) Int. Cl.
*B67D 7/04* (2010.01)
*B67D 7/14* (2010.01)
(Continued)

(52) U.S. Cl.
CPC ............. *B67D 7/04* (2013.01); *B67D 7/145* (2013.01); *B67D 7/16* (2013.01); *B67D 7/221* (2013.01);
(Continued)

(58) Field of Classification Search
CPC ........................................................ B67D 7/04
(Continued)

(56) References Cited

U.S. PATENT DOCUMENTS 5,689,071 A   11/1997   Ruffner et al.
5,734,851 A    3/1998   Leatherman et al.
(Continued)

FOREIGN PATENT DOCUMENTS

| IT | 0001353807 | 1/2004 |
| WO | 2013040169 A1 | 3/2013 |
| WO | 2015184306 A1 | 12/2015 |

OTHER PUBLICATIONS

International Search Report and Written Opinion dated Oct. 6, 2017 in corresponding PCT application serial No. PCT/US2017/044165.

*Primary Examiner* — Santiago Garcia
(74) *Attorney, Agent, or Firm* — Nelson Mullins Riley & Scarborough, LLP

(57) ABSTRACT

A retail fueling environment comprises a plurality of fuel dispensers located so that each defines at least one refueling position. Site automation electronics are in communication with the plurality of fuel dispensers. A fueling position availability indicator system is also provided, including a plurality of position indicators indicating availability status of at least one associated refueling position. Detection electronics are operative to ascertain data regarding transaction status of refueling transactions at the refueling positions. In addition, processing electronics are operative to determine a state of each of the position indicators based at least in part on the transaction status. A position indicator control device is operative to produce control signals to the position indicators.

13 Claims, 10 Drawing Sheets

(51) Int. Cl.
  *B67D 7/16* (2010.01)
  *B67D 7/22* (2010.01)
  *G06Q 20/20* (2012.01)
  *G06Q 30/06* (2012.01)
  *G07F 13/02* (2006.01)
  *G06F 3/0481* (2013.01)
  *G06Q 40/00* (2012.01)

(52) U.S. Cl.
  CPC ......... *G06F 3/0481* (2013.01); *G06Q 20/206* (2013.01); *G06Q 30/0601* (2013.01); *G07F 13/025* (2013.01); *G06Q 40/00* (2013.01)

(58) Field of Classification Search
  USPC .......................................................... 340/540
  See application file for complete search history.

(56) References Cited

U.S. PATENT DOCUMENTS

| | | | |
|---|---|---|---|
| 5,859,416 A | 1/1999 | Gatto | |
| 5,956,259 A | 9/1999 | Hartsell et al. | |
| 6,052,629 A | 4/2000 | Leatherman et al. | |
| 6,073,840 A | 6/2000 | Marion | |
| 6,089,284 A | 7/2000 | Kaehler et al. | |
| 6,098,879 A | 8/2000 | Terranova | |
| 6,116,505 A | 9/2000 | Withrow | |
| 6,364,206 B1 | 4/2002 | Keohane | |
| 6,422,464 B1 | 7/2002 | Terranova | |
| 6,435,204 B2 | 8/2002 | White et al. | |
| 6,442,448 B1 | 8/2002 | Finley et al. | |
| 6,704,774 B2 | 3/2004 | Terranova | |
| 6,741,909 B2 | 5/2004 | Leatherman et al. | |
| 6,801,835 B2 | 10/2004 | Covington et al. | |
| 6,813,609 B2 | 11/2004 | Wilson | |
| 6,882,900 B1 | 4/2005 | Terranova | |
| 6,935,191 B2 | 8/2005 | Olivier et al. | |
| 7,039,389 B2 | 5/2006 | Johnson, Jr. | |
| 7,280,087 B2 | 10/2007 | Williams et al. | |
| 7,289,877 B2 | 10/2007 | Wilson | |
| 7,546,251 B1 | 6/2009 | Leatherman et al. | |
| 7,574,377 B2 | 8/2009 | Carapelli | |
| 7,607,576 B2 | 10/2009 | Robertson et al. | |
| 7,664,885 B2 | 2/2010 | Carapelli | |
| 7,774,231 B2 | 8/2010 | Pond et al. | |
| 8,032,414 B2 | 10/2011 | Payne et al. | |
| 8,342,407 B2 | 1/2013 | Williams et al. | |
| 8,386,322 B2 | 2/2013 | Williams et al. | |
| 8,730,062 B2 * | 5/2014 | Eldershaw | G08G 1/147 340/521 |
| 8,897,708 B2 | 11/2014 | Witkowski et al. | |
| 8,925,808 B2 | 1/2015 | Harrell | |
| 8,983,137 B2 | 3/2015 | Hradetzky | |
| 9,047,596 B2 | 6/2015 | Williams et al. | |
| 2001/0020198 A1 | 9/2001 | Wilson | |
| 2003/0200108 A1 | 10/2003 | Malnoe | |
| 2004/0050648 A1 | 3/2004 | Carapelli | |
| 2004/0182921 A1 | 9/2004 | Dickson et al. | |
| 2004/0254861 A1 | 12/2004 | Pentel | |
| 2005/0085226 A1 | 4/2005 | Zalewski et al. | |
| 2005/0184155 A1 | 8/2005 | Pinkus | |
| 2007/0106559 A1 | 5/2007 | Harrell | |
| 2007/0261760 A1 * | 11/2007 | Harrell | B67D 7/08 141/197 |
| 2008/0040287 A1 | 2/2008 | Harrell et al. | |
| 2008/0248815 A1 | 10/2008 | Busch | |
| 2008/0308628 A1 | 12/2008 | Payne et al. | |
| 2009/0004024 A1 | 1/2009 | Durham et al. | |
| 2009/0048710 A1 | 2/2009 | DeLine | |
| 2009/0048945 A1 | 2/2009 | DeLine | |
| 2009/0084840 A1 | 4/2009 | Williams et al. | |
| 2009/0129403 A1 | 5/2009 | Harrell et al. | |
| 2009/0259590 A1 | 10/2009 | Carapelli | |
| 2009/0265638 A1 | 10/2009 | Carapelli et al. | |
| 2010/0268612 A1 | 10/2010 | Barrio et al. | |
| 2011/0022223 A1 | 1/2011 | Johnson, Jr. et al. | |
| 2011/0040503 A1 * | 2/2011 | Rogers | B67D 7/222 702/55 |
| 2011/0185319 A1 | 7/2011 | Carapelli | |
| 2012/0166018 A1 | 6/2012 | Larshan et al. | |
| 2013/0121428 A1 | 5/2013 | Carapelli et al. | |
| 2013/0232019 A1 | 9/2013 | Frieden et al. | |
| 2013/0246171 A1 | 9/2013 | Carapelli | |
| 2014/0074714 A1 | 3/2014 | Malone et al. | |
| 2014/0089174 A1 | 3/2014 | Carapelli et al. | |
| 2014/0114473 A1 | 4/2014 | McNinch | |
| 2014/0236678 A1 * | 8/2014 | Akerman | G06Q 30/0205 705/7.34 |
| 2014/0305545 A1 | 10/2014 | Butler, Jr. | |
| 2015/0032558 A1 | 1/2015 | Bonk et al. | |
| 2015/0105920 A1 | 4/2015 | Carapelli et al. | |
| 2015/0106196 A1 | 4/2015 | Williams et al. | |
| 2015/0120476 A1 | 4/2015 | Harrell | |
| 2015/0142588 A1 | 5/2015 | Hum et al. | |
| 2017/0267513 A1 * | 9/2017 | Kittoe | B67D 7/78 |
| 2017/0355588 A1 * | 12/2017 | Fieglein | B67D 7/04 |

\* cited by examiner

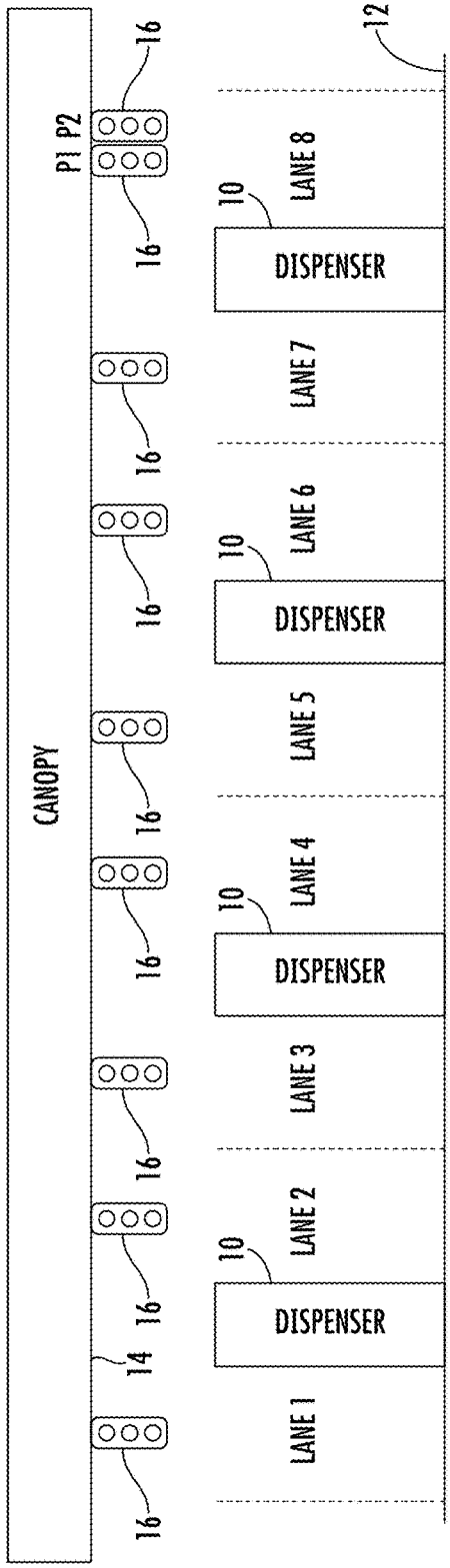
FIG. 1
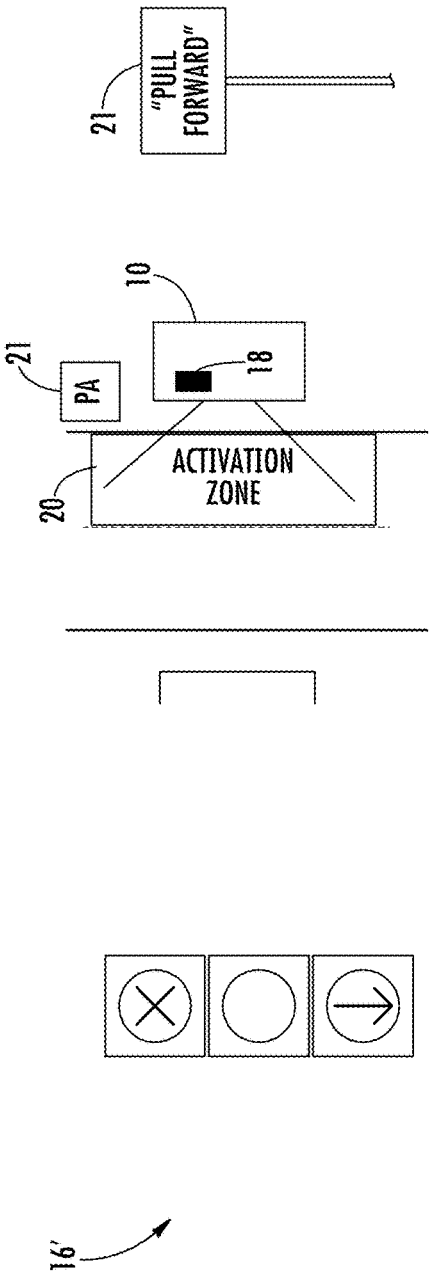
FIG. 2A
FIG. 2
FIG. 1A

FUEL DISPENSING ENVIRONMENT UTILIZING FUELING POSITION AVAILABILITY INDICATOR SYSTEM

PRIORITY CLAIM

This application is based upon and claims the benefit of U.S. provisional application Ser. No. 62/368,063, filed Jul. 28, 2016 and U.S. provisional application Ser. No. 62/481,639, filed Apr. 4, 2017, both of which are incorporated fully herein by reference for all purposes.

FIELD OF THE INVENTION

The present invention relates generally to service stations at which fuel is dispensed. More particularly, the present invention relates to a fueling environment utilizing a system to notify a customer of fueling position availability.

BACKGROUND

Very busy fueling stations often have quite long queues of vehicles waiting to access a dispenser for refueling. A customer wanting to refuel must quickly choose a refueling lane (i.e., the approach to a fueling position) based on an observation of the relative lengths of the respective queues and the refueling status of the vehicle currently at the dispensing position. As a result, traffic at the service station can be chaotic. In addition, customers may be frustrated to discover after choosing a dispensing position that the reason the position appears open is that it is out of service. It would be advantageous to the retailer if refueling throughput at the service station could be increased, thus enhancing customer satisfaction.

SUMMARY OF CERTAIN ASPECTS

The present invention recognizes and addresses the foregoing considerations, and others, of prior art construction and methods. In this regard, certain exemplary and nonlimiting aspects of the present invention will now be described. These aspects are intended to provide some context for certain principles associated with the present invention, but are not intended to be defining of the full scope of the present invention.

Certain aspects of the present invention are directed to a system for providing customers with information useful in the quick selection of a dispensing lane. Examples of retail fueling environments, fuel dispensers, and user interfaces for fuel dispensers are provided in U.S. Pat. No. 6,435,204 (entitled "Fuel Dispensing System"), U.S. Pat. No. 5,956,259 (entitled "Intelligent Fueling"), U.S. Pat. No. 5,734,851 (entitled "Multimedia Video/Graphics in Fuel Dispensers"), U.S. Pat. No. 6,052,629 (entitled "Internet Capable Browser Dispenser Architecture"), U.S. Pat. No. 5,689,071 (entitled "Wide Range, High Accuracy Flow Meter"), U.S. Pat. No. 6,935,191 (entitled "Fuel Dispenser Fuel Flow Meter Device, System and Method"), U.S. Pat. No. 7,289,877 (entitled "Fuel Dispensing System for Cash Customers") and U.S. Pat. No. 7,774,231 (entitled "Electronic Payment Methods for a Mobile Device") and U.S. published patent application nos. 20090048710 (entitled "Fuel Dispenser"), 20100268612 (entitled "Payment Processing System for Use in a Retail Environment Having Segmented Architecture"), and 20110185319 (entitled "Virtual PIN Pad for Fuel Payment Systems"). The entire disclosure of each of the foregoing patents and applications is hereby incorporated by reference as if set forth verbatim herein for all purposes.

In this regard, some aspects of the present invention involve a retail fueling environment comprising a plurality of fuel dispensers located so that each defines at least one refueling position. Site automation electronics are in communication with the plurality of fuel dispensers. A fueling position availability indicator system is also provided, including a plurality of position indicators (e.g., visual indicators) indicating availability status of at least one associated refueling position. Detection electronics are operative to ascertain data regarding transaction status of refueling transactions at the refueling positions. In addition, processing electronics are operative to determine a state of each of the position indicators based at least in part on the transaction status. A position indicator control device is operative to produce control signals to the position indicators.

According to some example embodiments, the detection electronics may comprise respective sniffers associated with the fuel dispensers, the sniffers being operative to detect signals indicative of the transaction status. In addition or in the alternative, the detection electronics may comprise proximity detection electronics operative to sense presence of a vehicle in the associated refueling position. For example, the proximity detection electronics may comprise a camera.

At least parking assist indicator may be associated with at least one of the refueling lanes, the parking assist indicator being operative to display information indicating when a vehicle has reached a selected location in the refueling lanes. In some embodiments, at least a portion of the processing electronics may be included in the position indicator control device. Alternatively or in addition, at least a portion of the processing electronics may comprise a cloud server remote from the position indicator control device.

Exemplary embodiments are contemplated in which the visual indicators each comprise a plurality of discrete lights of different colors (e.g., red, yellow, and green lights) selectively illuminated to convey information. The plurality of discrete lights may be arranged in a light stack.

In some exemplary embodiments, each of the dispensers includes connection electronics operative to establish a wireless communication link with a suitably-equipped vehicle in the at least one refueling position. The connection electronics may be operative to obtain information from the suitably equipped vehicle regarding at least one of fuel tank total volume and fuel tank current fuel volume. The fuel tank total volume information may be derived after receipt of information indicating type of vehicle.

Other aspects of the present invention provide a refueling position indicator apparatus for use in conjunction with a fuel dispenser. The apparatus comprises a position indicator operative to visually indicate availability status of an associated refueling position. Detection electronics are operative to ascertain data regarding transaction status of a refueling transaction at the associated refueling position. A position indicator control device is operative to produce control signals to the position indicator.

Further aspects of the present invention provide a method of indicating availability of a refueling position adjacent to a fuel dispenser. One step of the method involves providing a position indicator having a plurality of discrete lights of different colors selectively actuatable to visually indicate availability status of an associated refueling position. According to another step, information indicative of actual status of a refueling transaction occurring at the fuel dispenser is detected. Future availability of the refueling position is determined based on the actual status. At least one of the discrete lights is selectively actuated so as to visually convey the future availability.

Different systems and methods of the present invention utilize various combinations of the disclosed elements and method steps as supported by the overall disclosure herein. Thus, combinations of elements other than those discussed above may be claimed. Moreover, the accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which:

FIG. 1 is an elevational representation of a plurality of fuel dispensing lanes incorporating a fueling position availability indicator system in accordance with certain aspects of the present invention.

FIG. 1A shows an alternative visual indicator that may be used according to some embodiments of the present invention.

FIG. 2 is a plan view representation of a dispensing lane in accordance with certain aspects of the present invention.

FIG. 2A illustrates a message appearing on the parking assist indicator of FIG. 2, here in the form of a sign.

Figure 3:
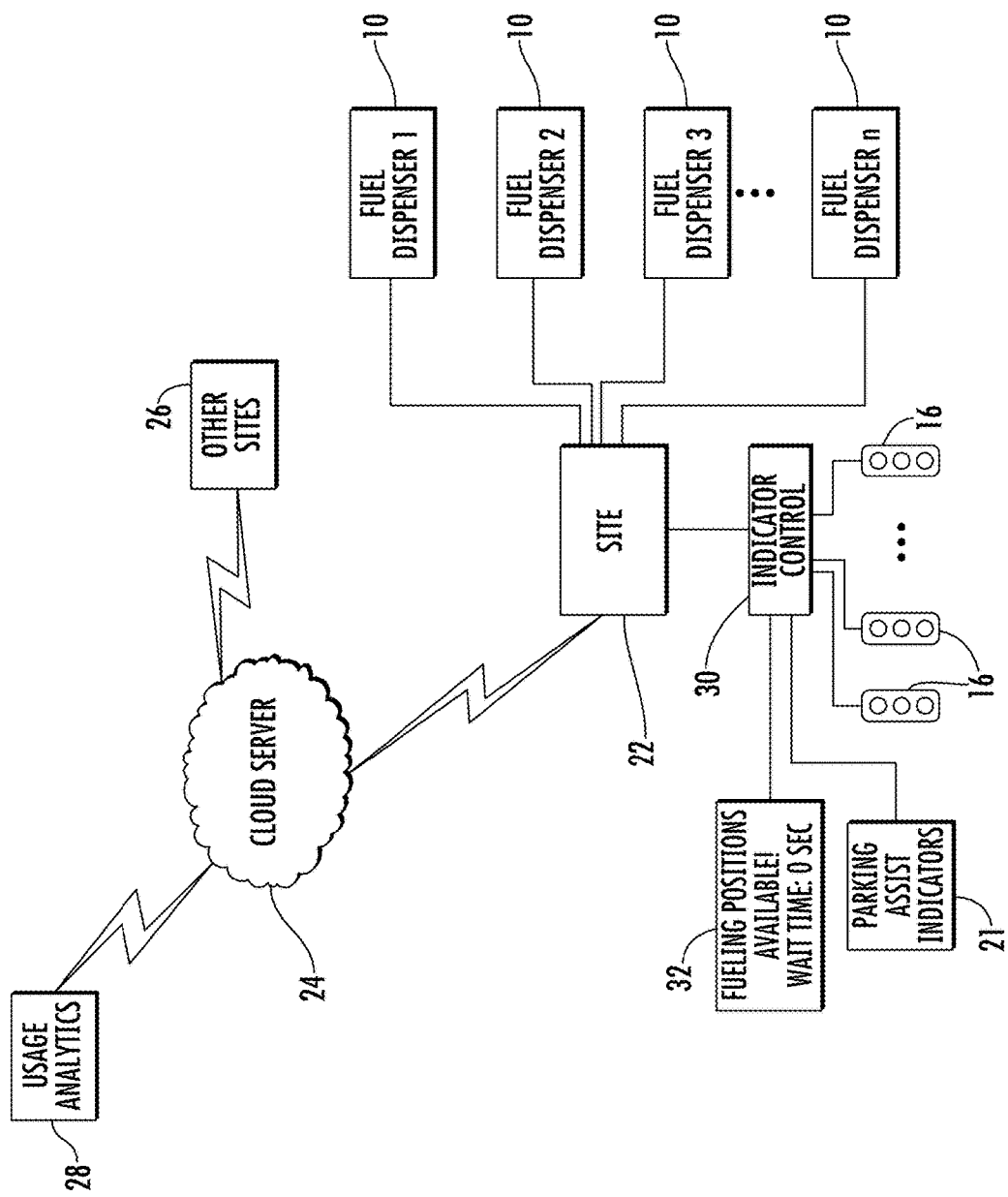
FIG. 3 is a diagrammatic representation of a retail fueling environment incorporating a fueling environment availability indicator system in accordance with certain aspects of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

FIGS. 1 and 2 diagrammatically illustrate a portion of the forecourt region of a retail fueling environment including certain aspects in accordance with the present invention. As can be seen, a plurality of fuel dispensers 10 extend vertically from surface 12 which may be traversed by vehicles to be refueled. (Typically, the fuel dispensers may actually be mounted on a concrete "island" 13 (FIG. 11) defining a curb about its periphery. It will be appreciated that the islands are omitted from FIGS. 1 and 2 to simplify the diagrams.) In many cases, a canopy 14 may extend over the dispensers to protect customers from rain during the refueling process.

As one skilled in the art will recognize, the fuel dispensers are typically configured to allow simultaneous dispensing to separate vehicles on each side. Thus, a total of four dispensers will result in eight discrete dispensing lanes, as shown in FIG. 1. In addition, multiple fuel dispensers may be aligned between the dispensing lanes resulting in several fueling positions along each lane. In the past, customers have been required to choose quickly one of these multiple dispensing lanes based on simple observation of the relative traffic in each. In accordance with the present invention, however, an indicator system is provided to inform customers of the refueling status of vehicles at the various dispensing positions. (Or, if a dispensing location is out of service or a delivery truck is in the way, the indicator system may also preferably so inform the customer.) As a result, customers are encouraged to select a dispensing lane that lessens congestion on the forecourt and otherwise enhances throughput.

A variety of different types of indicators may be used for this purpose, including indicators that define a travel path in the forecourt itself. For example, various indicators can be embedded in surface 12 and selectively illuminated to show the customer where to go. Typically, however, the indicator may be a visual indicator that clearly denotes the current status of a dispensing position. In the illustrated embodiment, for example, respective visual indicators 16 are associated with each of the dispensing lanes and/or positions. In the illustrated embodiment, for example, a single visual indicator 16 is associated with each of lanes 1-7. Lanes 1-7 may each have only a single fueling position, meaning that a lane indicator and position indicator would be the same. If there are multiple fueling positions in any of lanes 1-7, the indicator may show that at least one of the fueling positions is available. Lane 8 in this example does have two fueling positions (designated "P1" and "P2"), each having its own visual indicator 16.

Indicators 16 may take a variety of forms as necessary or desired, including countdown clocks, dynamic lights that flash with a frequency that indicates availability, pie chart indicators, and the like. In the illustrated embodiment, however, visual indicators 16 are similar to common traffic signals having vertically-aligned green ("Go"), yellow ("Caution"), and red ("Stop") lights. (As one skilled in the art will appreciate, the actual light source may emit in the resulting color or white light may pass through a lens to produce the resulting color.) According to some embodiments, the indicators 16 may be operated on a stand-alone basis, indicating whether or not a particular fueling position is available without regard to the status of other fueling positions. While such a stand-alone system may be an improvement over no indicator system at all, indicators 16 are preferably controlled based not only on the status of the associated dispensing position, but also knowledge of the status of the other dispensing positions. A green indicator may thus indicate that a particular fueling position is "more available" than another position even if both are currently occupied by other vehicles. For example, one of the vehicles may be nearer the beginning of its fueling transaction whereas the other vehicle may be nearer the end of its fueling transaction.

FIG. 1A illustrates a visual indicator 16' in accordance with an alternative embodiment. Rather than simple green, yellow, and red lights, an illuminated green arrow and an illuminated red "X" are provided to convey additional graphical information. For example, the angle of the green arrow can be adjusted as required for traffic flow clarity.

A variety of techniques may be utilized to determine the presence of a vehicle in a dispensing position and/or the status of its current transaction. For example, each of the dispensers (or nearby structures) may be equipped with suitable proximity detectors to determine vehicle presence. This is illustrated, for example, in FIG. 2, where dispenser 10 includes proximity detection electronics 18 which detect a vehicle in the fueling position 20 (denoted "Activation Zone"). Any suitable presence detection techniques may be utilized for this purpose, including computer vision, vehicle heat sensing, in-ground inductive sensors, weight sensors, ultrasonic detectors, light (e.g., infrared) beam, etc. In addition, the detection electronics 18 may advantageously determine the relative position of the vehicle in the activation zone (i.e., the effective area of the presence detection devices). Specifically, because most vehicles have their fuel fill door in the same approximate location (with only the side typically being different from vehicle to vehicle), detection electronics 18 may determine whether the fill door is approximately adjacent to nozzle cradle (boot) of the dispenser. This fact can be used to signal the driver where to stop.

For example, as shown in FIG. 2A, a parking assist indicator 21 here takes the form of a sign showing messages (e.g., "Pull Forward" or "Stop Now") helpful to the driver. Alternatively, or in addition, a message may be sent in a "connected car" embodiment (e.g., shown in FIG. 8) to the vehicle's infotainment system such as an audible message played over the vehicle's radio. In any case, the parking assist functionality reduces the need for the driver to make adjustments to the vehicle's position which enhances throughput at the service station.

In addition to or in lieu of presence detection, the indicator system may be configured to obtain and utilize knowledge of the actual status of the fueling transaction at each fueling position. This information may be provided by a direct connection to the site automation equipment (i.e., the site's point-of-sale (POS) and forecourt controller) or to the fuel dispenser. However, in accordance with the embodiment described below, a "sniffer" is located in each dispenser to detect transaction status information without a direct interface to the site automation equipment or dispenser control electronics. This allows the system to be installed as a retrofit without significant modification that might otherwise be required for communication with equipment from different manufacturers.

In this regard, FIG. 3 illustrates further details about a fuel dispensing environment in which a plurality of fuel dispensers 10 are located. The fuel dispensing environment will typically include a central building having a convenience store ("C-store") and also housing a POS system, forecourt controller, electronic payment server, and/or other devices to control fueling transactions. Such devices are collectively represented in this illustration as site 22. Site 22 provides communication with a cloud server 24, which similarly communicates in this embodiment with other fueling sites 26. Data from site 22 and optionally from other sites 26 are compiled in a usage analytics database 28, which may be used in the control of indicators 16. In this regard, the fueling environment preferably has a centralized indicator control device 30 that is used to set and change the status of each of the visual indicators 16. In addition, a site summary indicator 32 may also be provided. Indicator 32 may, for example, be located at the entrance of the site to inform a prospective customer of the site's general availability. In this case, indicator 32 informs a customer that there are available fueling positions. Information regarding average wait time may also be provided. As discussed more fully below, the system's internet connectivity allows the same information to be sent to or accessed by prospective customers in the area such as via an "app" executing on a smart phone or other mobile device.

Figure 4:
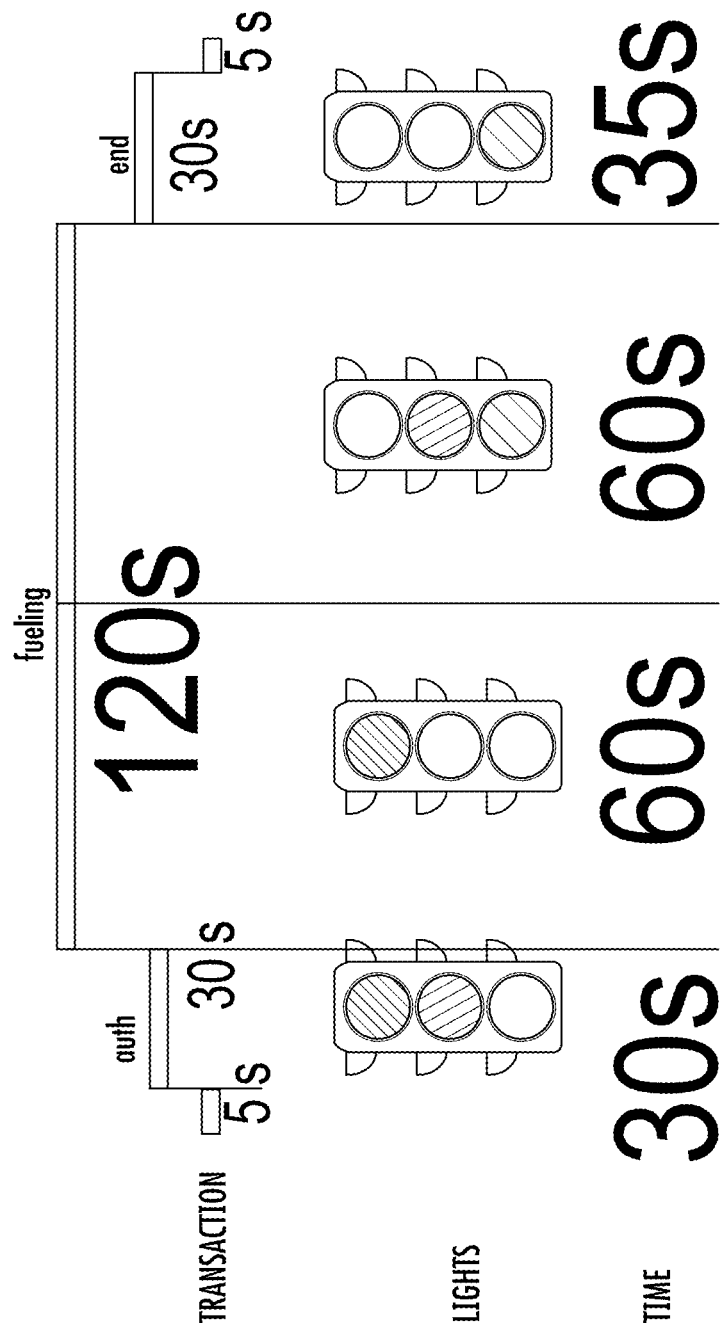
FIG. 4 is a diagram showing the state of a single fueling position indicator at different stages in the dispensing process.

FIG. 4 illustrates the manner in which a visual indicator 16 can be controlled to provide efficient throughput at the associated dispensing position and/or lane. As shown, the lights are changed depending on the stage of the transaction to inform another customer in the queue of the status of the current transaction. In FIG. 4. the transaction proceeds from left to right as follows:

Approaching the dispenser—The process of driving up and stopping at the fueling position generally takes around 5-10 seconds. During this time, visual indicator 16 is illuminated green.

Authorization—The authorization process typically begins when the customer (or attendant) inserts a payment card into the card reader. Considering user time and network authorization time, this generally takes around 10-30 seconds. During this time, visual indicator 16 may be illuminated red and yellow.

Refueling time—This is the actual time that fuel flows, ending when the nozzle is replaced in the dispenser's nozzle boot. While the actual time varies depending on the size and current fuel volume in the customer's tank, it will normally take 1-2 minutes. As a result, the system may change the indicator at a selected time estimated to be midway through the refueling process. In FIG. 4, for example, the visual indicator is red for the first 60 seconds after refueling begins, then changes to yellow and green. Alternatively, if information about the actual fuel level in the tank is known (e.g., through connected car capability) or the particular customer's purchase history indicates that a different estimate of filling time is appropriate, the changeover to yellow and green can be adjusted accordingly. If a vehicle is not previously known to the system, information about the current purchase can be added to the database in case the vehicle is "seen" again in the future.

End transaction—This period begins when the nozzle is replaced in the dispenser's nozzle boot. The dispenser will often print a receipt and display a "thank you message" for the customer. In a self-service environment, the customer will then get back in the vehicle, turn on the engine, and drive off. This generally takes 15-30 seconds, during which time visual indicator 16 may display green.

Thus, knowing the actual stages and the profile of a typical transaction allows a much more effective indication of "trends" for the current transaction. There is a clear visual sense of the dynamic evolution of the transaction that psychologically reduces the impact of the wait time on the customer.

As noted above, preferred embodiments of the present invention are adapted to derive information about the transaction status at a particular dispenser. Many existing fuel dispensers utilize low-data rate legacy cables, such as two-wire or RS422, to exchange messages with the forecourt controller and point-of-sale (POS) system located in the convenience store. In this embodiment, dispenser electronics 104 transmit signals to and receive signals from forecourt controller (FCC) 106 over two-wire ("TW") legacy cable 108. As is well-known, FCC 106 receives requests to initiate a transaction from dispenser electronics 104 and instructs dispenser electronics 104 to allow dispensing of fuel after the transaction has been authorized. When dispensing of fuel has been finalized, dispenser electronics 104 provides information on the volume and monetary amount of the dispensed fuel back to FCC 106 so that the transaction can be finalized.

Because the low frequency of two-wire communication limits the speed of data transfer, efforts have recently been made to utilize legacy wiring to provide high bandwidth communications, such as video advertising, to the dispensers. One such system is disclosed in U.S. Pub. App. No. 2013/0121428, incorporated herein by reference in its entirety for all purposes. In accordance with the present invention, high bandwidth communication may be utilized to provide transaction status information to cloud server 24 and/or control device 30 so that the state of all visual indicators 16 at the site may be most effectively controlled.

Figure 5:
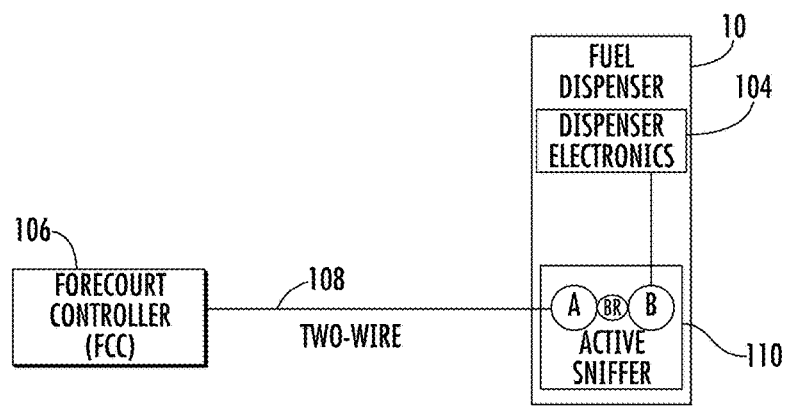
FIG. 5 is a diagrammatic representation of a fuel dispenser equipped with a sniffer device that may be utilized in the system shown in FIG. 3.
Figure 6:
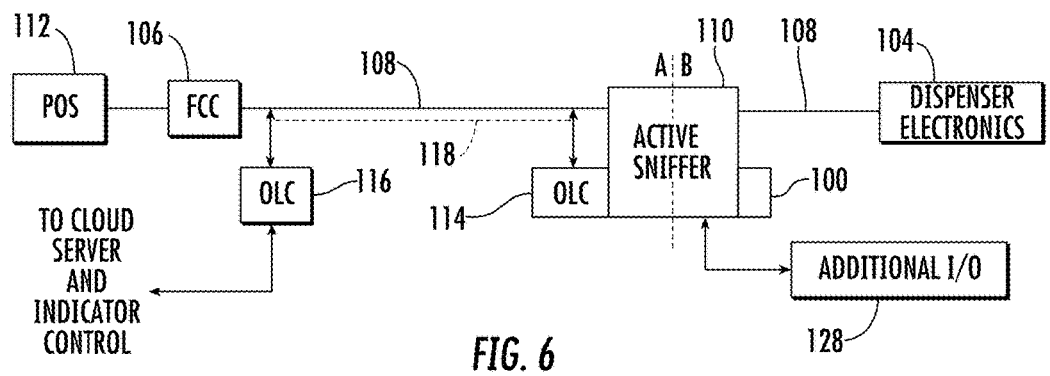
FIG. 6 is a diagrammatic representation showing installation of a sniffer device between existing electronics inside the dispenser and a forecourt controller in accordance with an embodiment of the present invention.

Aspects of the present invention may be incorporated into new dispensers at the time of manufacture, or may be added to existing dispensers as a retrofit. In the embodiment of FIG. 5, for example, an existing dispenser 10 has been retrofit via the inclusion of an active sniffer 110. An exemplary active sniffer that may be used for this purpose is shown and described in U.S. Pub. App. No. 2015/0105920, incorporated herein by reference for all purposes. As shown, sniffer 110 is installed at an intermediate location along cable 108 between dispenser electronics 104 and FCC 106. Referring now also to FIG. 6, active sniffer 110 is an electronic device that intercepts messages appearing along cable 108 on either its "A" side or "B" side. Sniffer 110 includes a suitably-programmed processor (and associated memory) that interprets the message, generally passing it along to the other side. Software module BR (FIG. 5) serves as a logical bridge to provide data buffering between sides A and B. (In some cases, sniffer 110 may substitute a different message for the one that was received, or provide a response that emulates a certain condition.) Embodiments are also contemplated that utilize a purely passive sniffer, which merely detects the messages flowing between pump electronics 104 and FCC 106.

In addition, sniffer 110 will preferably include a TCP/IP channel that can allow communication to cloud server 24 and/or control device 30. This may be accomplished by various wireless techniques, such as wifi, Zigbee, or other mesh network technology. Often, however, it will be desirable to provide a wired connection to sniffer 110 to ensure more reliable connectivity. For example, high speed data communication may be provided over legacy cable 108, such as using DSL or HomePlug techniques. In this regard, the illustrated embodiment provides a first over legacy cable (OLC) modem 114 connected to a suitable port of sniffer 110. A second OLC modem 116 is located away from fuel dispenser 10, such as inside the convenience store. As indicated at 118, high bandwidth network communications are transmitted on cable 108 along with the lower frequency two-wire signals transmitted to and from FCC 106. Modem 116 is connected to a suitable router or gateway that provides communication with cloud server 24 and/or control device 30.

Figure 7:
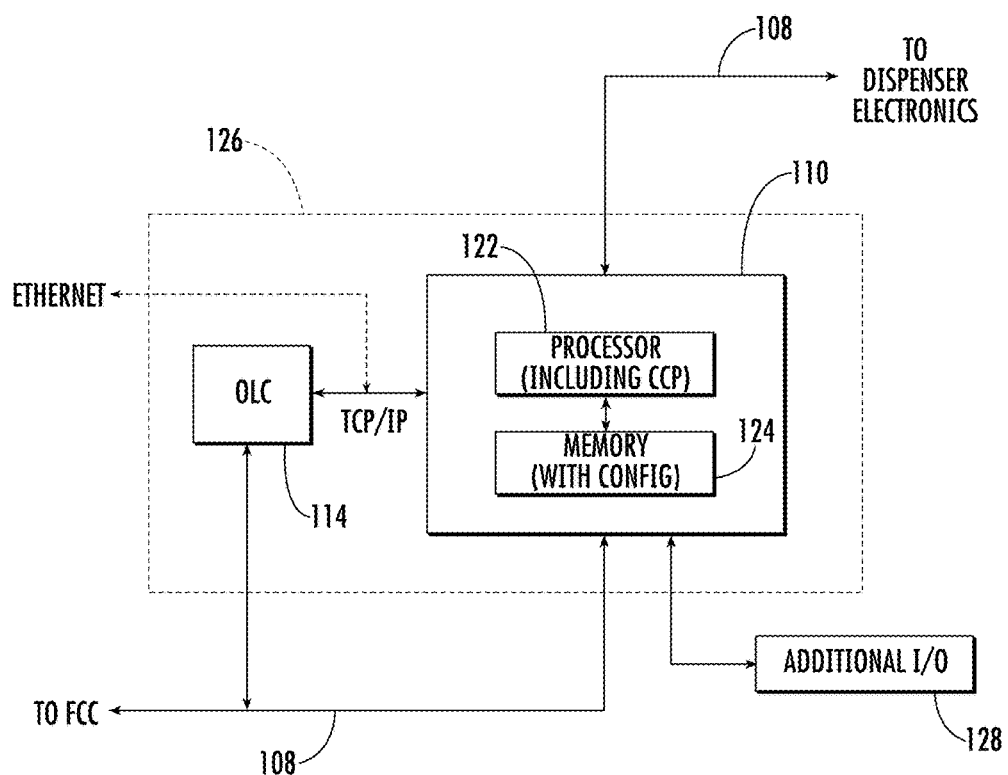
FIG. 7 is a diagrammatic representation of an active sniffer device in accordance with an embodiment of the present invention.

Alternatively, as shown in FIG. 7, the TCP/IP connection may be provided via Ethernet cable. In many cases, however, the use of Ethernet cable will not be the preferred option due to the difficulty of running new cable in existing installations. As noted, OLC modem 114 allows a new dispenser equipped with sniffer 110, or an existing dispenser retrofit with a kit including sniffer 110, to utilize advantageously the legacy two-wire cable already in place under the service station's forecourt. As also shown, sniffer 110 includes a suitable processor 122 that communicates with an on-board memory 124. In this embodiment, processor 122 preferably includes cloud connection processor (CCP) capability. Memory 124, which may be one or more physical devices in actual practice, preferably has volatile and non-volatile aspects. In some cases, for example, some or all of memory 124 may be located on the same chip as processor 122 (which will generally also include cache memory to facilitate its operation). The configuration file is preferably stored in nonvolatile memory of memory 124. Sniffer 110, along with OLC modem 114, can be conveniently packaged together in a retrofit kit 126 for installation in an existing fuel dispenser.

Figure 8:
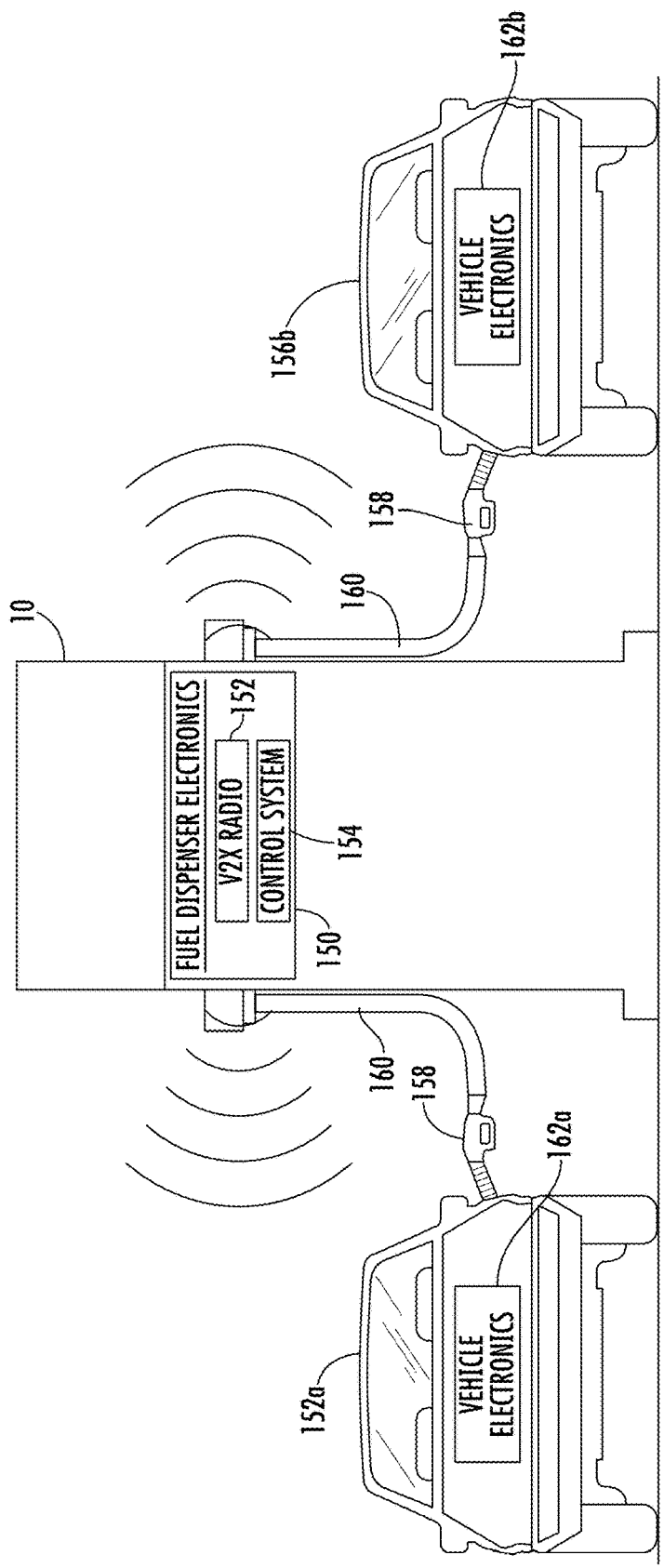
FIG. 8 is a diagrammatic elevation showing a pair of vehicles being refueled at respective fueling positions on two sides of a dispenser, the dispenser and the vehicles being in wireless communication with each other.

Referring now also to FIG. 8, preferred embodiments may utilize wireless connections with vehicles in the forecourt to provide additional capability to systems and methods of the present invention. In this regard, electronics 150 of fuel dispenser 10 are in this case equipped with circuitry, denoted V2X Radio 152 (which include one or more suitable antennas) that allows for the creation of ad hoc wireless networks on a one-to-one basis with suitably-equipped vehicles in the area (e.g., within a 200-yard radius). As shown, V2X radio 152 is in communication with or is incorporated into the fuel dispenser's control system 154.

A pair of vehicles 156*a-b* are shown adjacent to fuel dispenser 10 in the fueling position. Nozzles 158, at the end of an associated hose 160, are inserted into the fill necks of the respective vehicle's fuel tank to receive fuel when authorized dispensing has begun. Vehicles 156*a-b* are equipped with vehicle electronics 162*a-b* allowing the creation of an ad hoc peer-to-peer network with a suitably equipped fuel dispenser. V2X Radio 152 functions to detect the presence of vehicles 156 to form the one to one networks on an as-needed basis. For example, in a preferred embodiment, V2X Radio 152 may provide wireless connectivity with the vehicle in accordance with standard 802.11p.

As a result, the vehicle can provide information at the initiation of and during a fueling transaction that is relevant to the availability of the various fueling positions in the forecourt. For example, information regarding the vehicle type (e.g., make and model) may be used to ascertain the capacity of the vehicles' fuel tanks. Information regarding the level of fuel in the tank can be sent from the vehicle to determine an estimate of the expected refueling time. Type of fuel required (e.g., diesel versus gasoline) can also be determined from the vehicle information. In addition, historical information, such as refueling preferences (e.g., grade of fuel) and previous refueling times, may be ascertained once the specific vehicle is identified and matched with a vehicle that has previously refueled at the same site or others in the network. Loyalty status may also be determined, such as by assuming that the typical driver of the vehicle is the current motorist. Alternatively, loyalty status may be obtained from a smartphone app installed on the motorist's phone, such as if the phone is connected to the vehicle's infotainment system (e.g., by Bluetooth connection).

Figure 9:
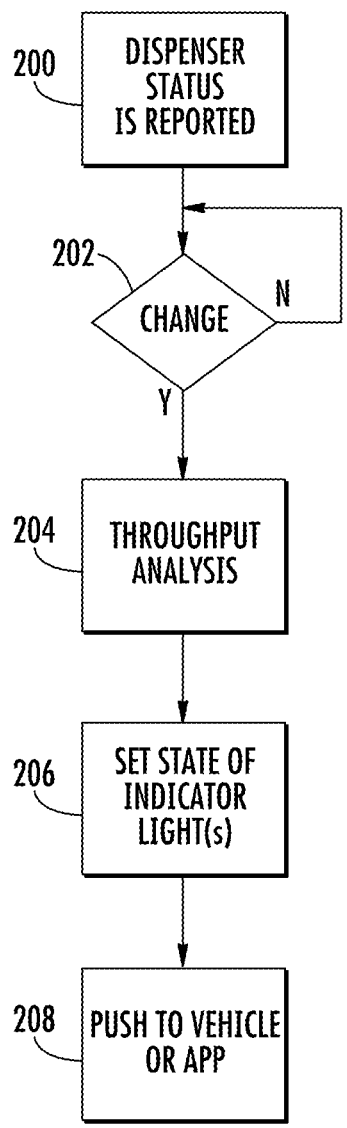
FIG. 9 is a flow chart showing exemplary process steps for controlling the state of the indicator(s), such as the indicator shown in FIG. 4.

FIG. 9 shows some basic aspects regarding use of the system illustrated in FIG. 3. As indicated at step 200, transaction status at the respective dispensers is reported to cloud server 24 and/or control device 30 (such as by the sniffer discussed above and/or communication with the vehicle being refueled). If the status is a change from the previous status (as indicated at step 202), a throughput analysis is performed (step 204). Based on the results of this analysis, the state of one of more of the visual indicators 16 can be changed (step 206).

As indicated at step 208, information regarding the status of the fueling site can be sent to potential customers in the area such as via an "app" for the operator of the fueling site installed on a potential customer's mobile device. The app may in turn display its information on the vehicle's infotainment screen if the mobile device is in short-range wireless connection with the vehicle (e.g., via a Bluetooth connection). The information sent to the app, and thus displayed in the vehicle, may indicate distance to the fueling location and the real-time status of the fueling position indicators (e.g., "Four fueling positions are currently available"). This capability may be especially desirable for drivers of commercial vehicles.

Figure 10:
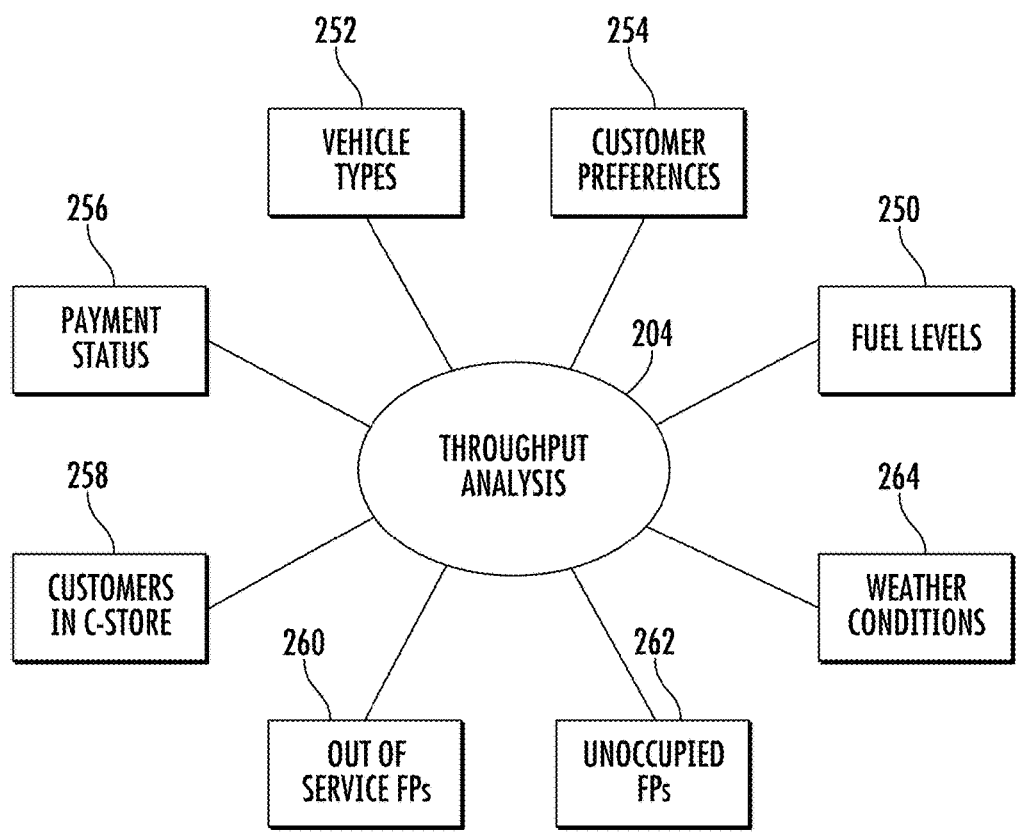
FIG. 10 diagrammatically illustrates various types and sources of data which may be used in the throughput analysis of FIG. 9.

Referring now to FIG. 10, it will be appreciated that the throughput analysis 204 may utilize a variety of different types and sources of data in order to provide accurate and predictive information regarding fueling position availability. The data to be used can be derived from the site itself, from the vehicles being refueling and their status, other sites in the area, and the like. In a preferred embodiment, as noted above, the analytics are performed by or in conjunction with cloud server 24 in order to utilize advantageously the significant computing power that remote computation can provide. Thus, cloud-based statistics and analytics allow real-time adjustment of indicator algorithms and operation based on real-time forecourt loads, vehicle types present, and other useful factors.

For example, vehicles that are capable of wireless communication with the dispensers 10 (or another access point by which the data can be obtained) can supply information regarding the level (volume) of fuel in the respective fuel tanks (as indicated at 250) as well as the vehicle type (e.g., make and model) from which the total volume of the fuel tank can be determined (as indicated at 252). In addition, some vehicles require diesel or other special fuel types which can also be derived with knowledge of the vehicle type. Known customer preferences, such as a preference for higher grade gasoline or a designated loyalty status, can be provided from the vehicle for consideration in the throughput analysis (as indicated at 254). For example, the system may react by directing a known customer who has achieved a certain loyalty status to a particular fueling position that minimizes that customer's wait time.

The status of a customer's payment is also preferably utilized in the throughput analysis (as indicated at 256). For example, finalization of payment indicates that refueling is completed and the customer will soon be driving away. Occasionally, however, the customer may decide during or after the refueling process to enter the convenience store. This event, which tends to increase the dwell time that a vehicle remains in a fueling position, can be detected (such as by suitable motion detectors associated with dispenser 10) and used to adjust the throughput analysis (as indicated at 258). Factors known to the fueling site, such as fueling positions that are out of service (as indicated at 260) and which, if any, fueling positions are currently not occupied (as indicated at 262) can also be utilized in the throughput analysis. Weather conditions also affect a customer's decision to stop for fuel, and can be used in the throughput analysis (as indicated at 264).

Figure 11:
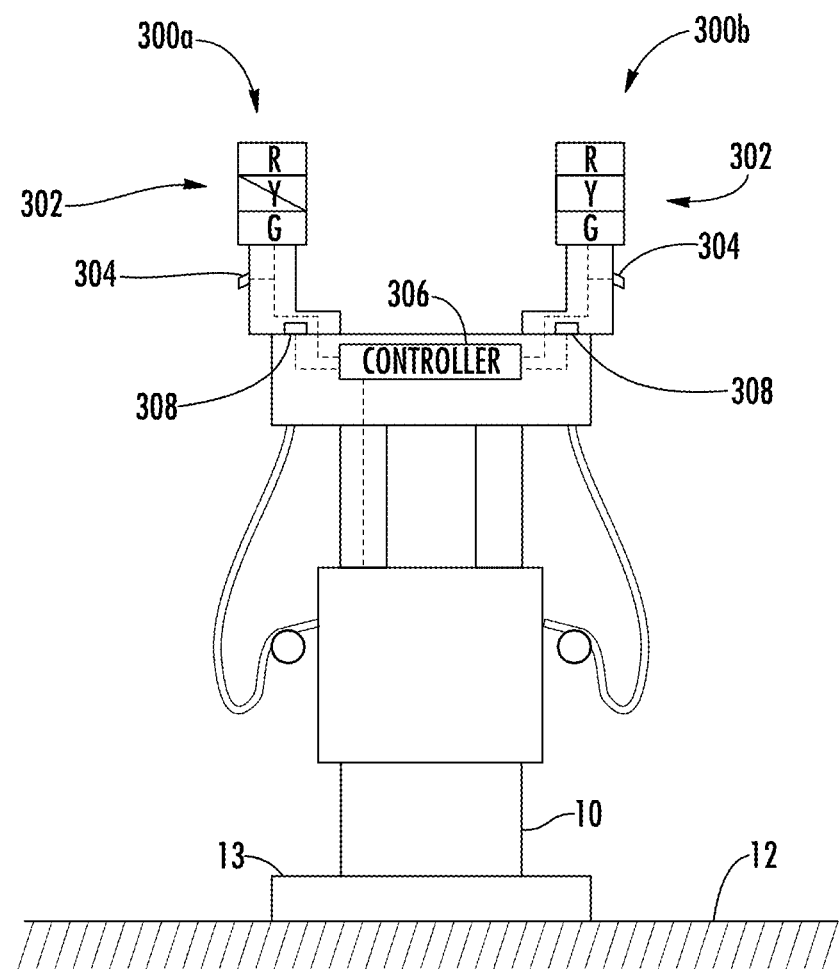
FIG. 11 is a diagrammatic illustration of a fuel dispenser equipped with a stand-alone fueling position availability indicator system in accordance with an embodiment of the present invention.

Referring now to FIG. 11, an existing fuel dispenser 10 has been retrofit with a pair of stand-alone position indicator devices 300a-b (each generally referred to as "device 300"). As shown, each device 300 includes a "stack light" 302. Stack lights 302 may have red, yellow, and green light portions located one above the other similar to visual indicators 16. In addition, stack lights 302 may be viewable around a 360° field of view to be easily seen by customers driving into the fueling position from either direction. Suitable mounting hardware is preferably provided to allow the light stacks 302 to be mounted to an existing fuel dispenser.

As shown, device 300 preferably includes a camera 304 or other imaging/motion detection sensors directed toward its respective fueling position. As discussed above, such presence detection devices can be used to determine whether a vehicle is located in the fueling position, the relative position in the fueling position at which the vehicle is located (e.g., for parking assist functions), whether the customer has retrieved the dispenser nozzle from its boot or returned the dispenser nozzle back to its boot, and whether the customer has left the area (e.g., to enter the convenience store). This information can be processed locally using controller 306 in order to ascertain the status of the fueling positions associated with dispenser 10. In addition, tamper detection circuitry 308 may be provided at the interface where the respective stack lights 302 are attached to the dispenser housing. As a result, a suitable alert or warning can be provided in the event of an attempt to detach the stack lights 302.

Figure 12:
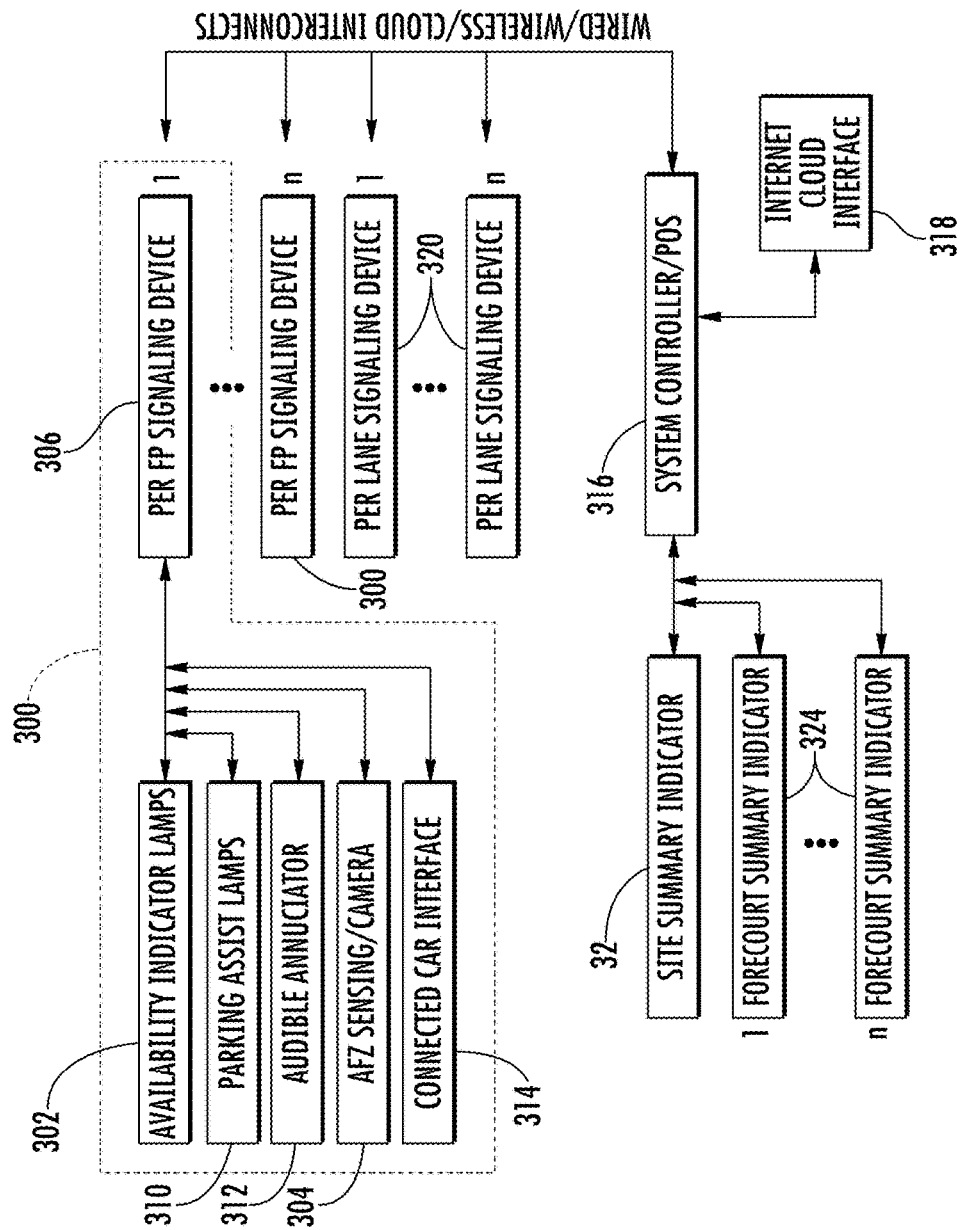
FIG. 12 is a diagrammatic representation showing a plurality of fueling position indicators as in FIG. 11 interconnected to yield a forecourt-wide availability indicator system.

Referring to FIG. 12, a plurality of devices 300 are connected together to provide an integrated forecourt fueling position availability system. In addition to stack lights 302 and camera 304 noted above, each device 300 in this case includes a parking assist indicator 310, some form of audible annunciator 312 (e.g., to provide anti-tampering warnings), and a suitable "connected car interface" 314 (e.g., to provide wireless V2X communications between the device 300 and the adjacent vehicle). In this case, however, the device 300 communicates with a site-wide indicator controller 316 (which may be integrated in whole or in part into the site controller or POS of the fueling environment). Controller 316 is preferably in communication with one or more remote servers (e.g., cloud server 24) via an internet cloud interface 318. In this way, the throughput analysis for the site can be performed remotely and sent back to controller 316 for setting the various indicators.

In this example, several fueling positions are aligned in each fueling lane so per lane indicators 320 are also provided. A site summary indicator 32 may also be provided. As noted above, site summary indicator 32 may be located, for example, at the entrance to the site to provide information about fueling position availability (e.g., "Four fueling positions are currently available" or "Average wait time is 30 seconds"). Alternatively, or in addition, a roadside indicator can be provided in advance of the fueling site (e.g., along an expressway before the exit that leads to the site). Also, the use of dynamically adaptable signs is contemplated. For example, pointing of the sign could be dynamic to point in the line of sight from the site entrance to fueling lanes as currently configured (large sites could dynamically configure fueling lanes). In the event that the fueling environment has multiple forecourts, such as one for vehicles and another for large trucks, similar per forecourt summary indicators 324 may also be provided.

It can thus be seen that the present invention provides a retail fueling environment having a fueling position availability indicator system. As described, some preferred embodiments utilize cloud-based statistics and analytics to maximize forecourt throughput or to meet other objectives. Long-term analytics, obtained from the local controller and/or the cloud, can be utilized to adjust the signaling timing over time. For example, the transition from "vehicle present but fueling almost complete" state to available can be timed to occur just before the vehicle has completely left the fueling position, gaining valuable seconds in forecourt efficiency. Also, marketing messages displayed at the fuel dispenser to the customer during the refueling process can be selected at least in part based on the expected dwell time at the dispenser as determined by the analytical process described above. Fueling positions reserved for loyalty customers can be indicated as unavailable, changing over to available when a loyalty customer is detected (as via a peer-to-peer network described above).

While one or more preferred embodiments of the invention have been described above, it should be understood that any and all equivalent realizations of the present invention are included within the scope and spirit thereof. For example, the indicators can communicate which lanes are dedicated to "fuel purchase only" in which sale of ancillary goods is not offered. In addition, the indicators can, for example, communicate "mobile payment available lanes" in which a reduced price for fuel is offered for payment with a mobile device.

Moreover, while much of the discussion above has involved fuel as the exemplary product being dispensed, one skilled in the art will recognize that aspects of the present invention are applicable to a wide variety of different goods and services. Thus, the embodiments depicted are presented by way of example only and are not intended as limitations upon the present invention. For example, many aspects of the present invention are described above in the exemplary context of a retail fueling environment. It should be understood by those of ordinary skill in this art, however, that the present invention is not limited to these embodiments because other commercial environments are contemplated and modifications can be made. Therefore, it is contemplated that any and all such embodiments are included in the present invention as may fall within the scope and spirit thereof.

What is claimed is:

1. A retail fueling environment comprising:
    a plurality of fuel dispensers located so that each defines at least one refueling position for a refueling transaction;
    site automation electronics in communication with said plurality of fuel dispensers;
    a fueling position availability indicator system including:
        a plurality of position indicators, each position indicator associated with at least one refueling position and visually indicating an availability status of the associated refueling position;
        detection electronics operative to ascertain data regarding a transaction status of the refueling transactions at the associated refueling positions;
        processing electronics operative to determine the availability status of each of said refueling positions based at least in part on said transaction status of the refueling transaction at the associated refueling position; and
        a position indicator control device operative to produce control signals to said position indicators that changes the availability status of the position indicators for the associated refueling positions based at least in part on the availability status of that refueling position received from the processing electronics.

2. A retail fueling environment as set forth in claim 1, wherein said detection electronics comprises respective sniffers associated with the fuel dispensers, said sniffers operative to detect signals indicative of said transaction status.

3. A retail fueling environment as set forth in claim 1, wherein said detection electronics comprise proximity detection electronics operative to sense presence of a vehicle in the associated refueling position.

4. A retail fueling environment as set forth in claim 3, wherein said proximity detection electronics comprise a camera.

5. A retail fueling environment comprising:
    a plurality of fuel dispensers located so that each defines at least one refueling position;
    site automation electronics in communication with said plurality of fuel dispensers;
    a fueling position availability indicator system including:
        a plurality of position indicators indicating availability status of at least one associated refueling position;
        detection electronics operative to ascertain data regarding transaction status of refueling transactions at the associated refueling positions, said detection electronics comprising proximity detection electronics operative to sense presence of a vehicle in the associated refueling position;
        processing electronics operative to determine a desired state of each of said position indicators based at least in part on said transaction status;
        a position indicator control device operative to produce control signals to said position indicators; and
    at least parking assist indicator associated with the associated refueling position, said parking assist indicator being operative to display information indicating when a vehicle has reached a selected location in the refueling position.

6. A retail fueling environment as set forth in claim 1, wherein at least a portion of said processing electronics are included in said position indicator control device.

7. A retail fueling environment as set forth in claim 1, wherein at least a portion of said processing electronics comprise a cloud server remote from said position indicator control device.

8. A retail fueling environment as set forth in claim 1, wherein the visual indicators each comprise a plurality of discrete lights of different colors selectively illuminated to convey information.

9. A retail fueling environment as set forth in claim 8, wherein said discrete lights of different colors comprise red, yellow, and green lights.

10. A retail fueling environment as set forth in claim 8, wherein the plurality of discrete lights are arranged in a light stack.

11. A retail fueling environment as set forth in claim 1, wherein each of said dispensers includes connection electronics operative to establish a wireless communication link with a suitably-equipped vehicle in the at least one refueling position.

12. A retail fueling environment as set forth in claim 11, wherein the connection electronics are operative to obtain information from the suitably equipped vehicle regarding at least one of fuel tank total volume and fuel tank current fuel volume.

13. A retail fueling environment as set forth in claim 12, wherein fuel tank total volume is derived after receipt of information indicating type of vehicle.

\* \* \* \* \*